March 30, 1937.  A. ZIMMERLI  2,075,326
MANOMETER
Filed Feb. 11, 1936
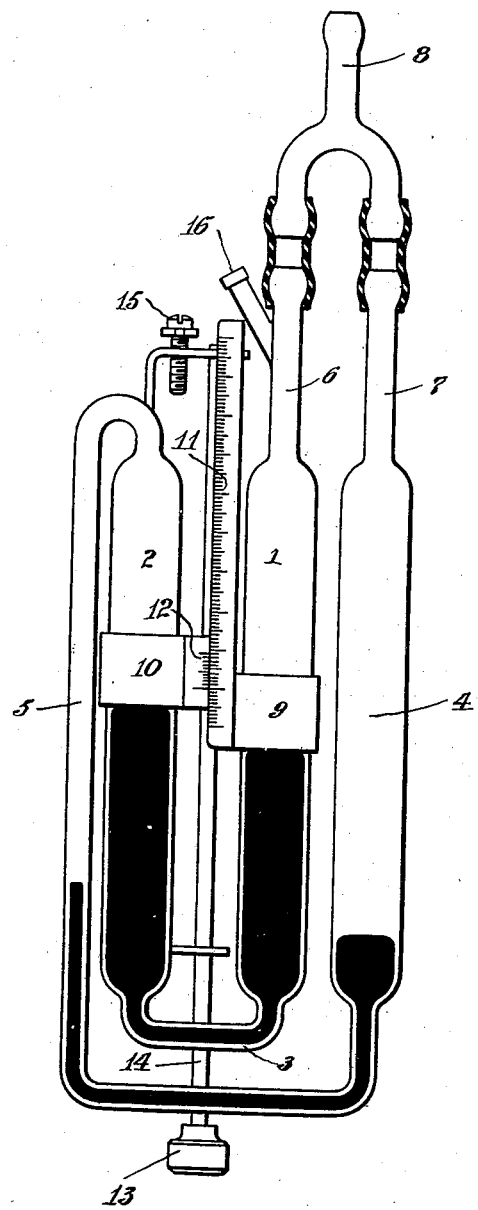
Adolph Zimmerli
INVENTOR
BY
ATTORNEY

UNITED STATES PATENT OFFICE 2,075,326

MANOMETER

Adolph Zimmerli, New Brunswick, N. J.

Application February 11, 1936, Serial No. 63,356

2 Claims. (Cl. 73—31)

This invention relates to a manometer of the commonly used U gage type, but because of certain novel features of construction the apparatus may be regarded as a precision vacuum gage from the standpoint of accuracy of readings, as well as the degree of vacuum which may be measured.

The commonly used U gage consists of two legs connected at their lower ends with either a wide or a constricted tube. One leg is closed, the other is open and can be connected to the vacuum line. When freed from air it is accurate and convenient. It has, however, several drawbacks, chiefly:

To remove all the air it is necessary to boil the mercury under reduced pressure. This is a delicate operation which has to be carried out by experts, and only special kinds of glass withstand the treatment.

In use, unless special precautions are observed, air is carried into the vacuum leg of the gage, thereby rendering it inaccurate after a short time. To restore accuracy it must be refilled in the manner just mentioned.

If the vacuum is released suddenly it often happens that the impact of the mercury on the glass breaks the top of the closed tube.

If the gage becomes dirty after use it is very difficult to clean it, so that many users prefer to discard it and put a new gage in its place.

It is among the objects of the present invention to provide a dependable manometer which has all the desirable features of the U gage, but is free from the drawbacks of the latter. That is to say, to provide a manometer which can be filled easily and quickly and without boiling the mercury in order to remove the air; one which there is no danger of breaking the glass if the vacuum is released suddenly; and one so designed that it is practically impossible for air to get into the system and distortion of the meniscus by capillary forces is eliminated.

Other objects of the invention have to do with features of construction, method of introducing the mercury into the system, etc. all of which will be apparent from a reading of the following specification.

In accompanying drawing:

The figure is an elevational view showing the assembled glass system and associated parts, while functioning, of a manometer embodying the invention.

Before proceeding with the description attention is directed to the fact that certain of the tubes comprising the glass system are capillary tubes while other tubes forming the gage proper are large comparatively speaking, and for convenience and sake of clarity these larger tubes will sometimes hereafter be referred to or designated as "non-capillary" tubes.

Referring to the drawing, glass tubes 1 and 2 form the legs of the U tube characteristic of vacuum gages of the present type. The tubes 1 and 2 are non-capillary, having an internal diameter of 16 mm. and length of 100 mm., and are joined together at their lower ends by a capillary tube 3. The tube 2 is generally referred to in the art as the "reference leg" of this type of gage. The upper end of the tube 2 is connected to the bottom of a non-capillary tube 4, by means of a capillary tube 5, which is bent downward to below the bottom of the U, then upward and joined to said tube 4. The interior diameter of the capillary tube 5 is 1.6 mm., while the tube 4 is of the same diameter and length as the tubes 1 and 2 forming the U. The tops of the tubes 1 and 4 are sealed to open tubes 6 and 7 respectively, of 6 mm. interior diameter, and said tubes 6 and 7 are connected by means of heavy rubber tubing, to a three way glass tube 8, commonly known as a T. The gage is connected to a vacuum line by the upper branch of the T.

For accurate and convenient reading of the pressure the gage is provided with metal sleeves 9 and 10, the sleeve 9 being connected to a millimeter scale 11, and the sleeve 10 being connected to a vernier 12. The adjusting means for operating the sleeves 9 and 10 may be of any approved construction and for that reason is more or less illustrated conventionally in the drawing. By turning a knob 13 which is mounted on a right and left hand screw 14, one sleeve may be lowered while the other is raised. The screw 15 permits the raising and lowering of both the sleeves 9 and 10 simultaneously. The adjustment of the scales 11 and 12 will be described more fully hereinafter.

The glass and metal parts may be solidly mounted on a base or rack (not shown) and a lamp may be supported therefrom to illuminate the glass tubes and scales. The instrument may be fixed on a table or the wall, or held by a clamp.

The reason for choosing a comparatively large diameter for the gage is twofold: In the first place the capillary influence on the meniscus is eliminated; in the second place errors due to air bubbles are minimized. The following examples will illustrate this point:

Suppose that for some reason an air bubble gets to the top of the bend between tubes 2 and 5 and suppose that it has a volume of 1 cu. mm. at atmospheric pressure. If it were flat it would separate the mercury columns in the capillary tube 5 by .5 mm., the capillary tube having a diameter of 1.6 mm. At .01 atm.—7.6 mm. absolute pressure—the volume would be 100 cu. mm. As the cross section of the large tube is 100 times that of the capillary tube, the height of the air layer of those 100 cu. mm., that is to say the error, would be .5 mm.

Depending on the accuracy desired, an air bubble of that size may or may not be objectionable. For example, at 15 mm. pressure the error would be .25 mm., that is to say about 1.7% of the absolute pressure, while at 3.8 mm. it would amount to 1 mm. or 26%. An air bubble at atmospheric pressure of a diameter of .25 mm., which is clearly visible with the naked eye, would cause an error of less than 1% at 2 mm. Even such a small bubble is not left when the gage is filled properly, as hereinafter described.

*Filling*

To fill the gage, pour mercury through the side tube 16 of tube 6 into tube 1 until tubes 1 and 2 are a little over half full; the level of the mercury should be close to the top of the sleeve 10 when the scale is at the zero point. It will take about 300 grams of mercury.

Close the side tube with a piece of rubber hose and a screw clamp, then connect the gage to a good vacuum pump at 8 and exhaust as far as possible. By tilting the gage to one side, then to the other repeatedly, by inclining it backward as far as possible and by tapping the glass sharply, the air adhering to the glass walls is brought to the surface.

When no more air bubbles are visible, the connections between 6 and the T, and 7 and the T are closed by pinching the rubber tube with a screw clamp, without disconnecting the vacuum pump.

The clamp on the side outlet is now carefully unscrewed slightly. The air entering into tube 6 will push the mercury slowly down in tube 1 and up in tube 2. It should take not less than 1 minute for the mercury level to get to the connection with the capillary tube 5.

When this is reached, the clamp on the side tube 16 is screwed tight, and the gage tilted slowly to the right. This will cause the mercury to flow over the top of the bend into the tubes 5 and 4. When the mercury level in the tube 1 approaches the bottom, the gage is put back to its vertical position. The screw clamps on the tubes 6 and 7 are now opened gradually, taking care that no mercury flows over the bend in either direction.

When the pressure is equalized, the pump is shut off and air admitted slowly by unscrewing the clamp on the side tube 16. The mercury will rise in the tubes 2 and 5 until the two columns unite, filling the tube 2 and 5 completely. The levels in tubes 1 and 4 will be about 15 mm. above the bottom. The instrument is now ready for use.

*Operation*

Connect the gage at 8 to the system the pressure of which is to be measured. For distillations it is advisable to have a safety flask filled with glass wool between the apparatus and the gage.

When the pressure decreases to about 120 mm. in the system, the mercury will separate at the top of the bend of tube 5. As the lowering of the pressure affects tubes 1 and 4 equally, the mercury will recede in the tubes 2 and 5, rising at the same time in the tube 1. The mercury column in the capillary tube 5 forms a seal between the reference leg 2 of the gage and the vacuum line, thus preventing air from getting into the reference leg, which feature is an important part of the invention. The difference between the levels in tubes 1 and 2 show the absolute pressure.

To read it, turn knob 13 until the lower edges of the sleeves 9 and 10 are at equal distances from the tops of the mercury columns. Now turn screw 15 with a screwdriver until the sleeves seem to touch the mercury. The lower edges of the sleeves and the meniscus of the mercury show up against a white background as sharply defined black straight and curved lines respectively. The pressure can now be read directly on scale 11. The vernier 12 allows a precision to within .1 mm.

With these adjustments made, the determination of all pressures up to 100 mm. can now be made by turning knob 13. Only occasionally, when the volume of the mercury changes due to operation at different temperatures or after refilling, will it be necessary to adjust screw 15 again.

*Removal of air*

Should air get into the system, it will collect at the top of the bend in tube 5. It can be detected, if its volume is too small to be visible as a bubble, by the observation that the two mercury columns do not flow together immediately when the pressure is increased to about 120 mm.

To remove the air, tilt the gage to the left until the mercury level in the tube is at the juncture with the capillary tube. Connect the vacuum pump and the gage; hold in the inclined position until the mercury separates. Then straighten the gage; pinch the rubber tube between the tube 6 and the T, and proceed as described for filling the gage.

*Modifications*

From the foregoing, certain modifications are obvious to those skilled in the art. For example, the dimensions of the tubes comprising the gage proper may be varied within wide limits, as, for instance, the length of the tubes 1 and 2 can be increased if a pressure of more than 100 mm. is to be measured, or decreased if only pressures of less than 10 mm. are to be measured.

The diameter of the tubes 1 and 2 may also be varied; however, it should not be less than 12 mm. in order to be free from any capillary influence, and it should be about ten times the diameter of the capillary tube 5. The length of the tube 5 is immaterial provided its lower bend is at least as low as the capillary 3. The diameter of the tube 4 is generally unimportant; however, it is desirable to make it as large as that of tubes 1 and 2 in order to reduce the variations of the level of the mercury to a minimum to prevent air from being carried into the capillary tube 5. For the same reasons it is desirable to have the diameter of the tube 3 restricted, although not necessarily a capillary.

The T could be permanently connected to the gage with glass stopcocks taking the place of the rubber tubing and clamps.

It is intended to cover all such modifications as come within the scope of the appended claims.

What is claimed is:

1. A differential vacuum tube gage comprising a tube system consisting of three non-capillary tubes arranged vertically and in transverse alignment, one of said non-capillary tubes having its opposite ends connected through capillary tubes to the lower ends of the outer non-capillary tubes, the upper ends of the outer non-capillary tubes being connected to a vacuum line, the lower bend of said capillary tube connecting the upper end of the intermediate non-capillary tube to the lower end of one of the outer non-capillary tubes being at least as low as the other capillary tube connection.

2. A differential vacuum tube gage comprising a tube system consisting of three non-capillary tubes arranged vertically and in transverse alignment, one of said non-capillary tubes having its opposite ends connected through capillary tubes to the lower ends of the outer non-capillary tubes, the upper ends of the outer non-capillary tubes being connected to a vacuum line, the lower bend of said capillary tube connecting the upper end of the intermediate non-capillary tube to the lower end of one of the outer non-capillary tubes being at least as low as the other capillary tube connection, mercury in the U-tube formed by the intermediate tube and the non-capillary tube connected to the lower end thereof, a mercury seal between the upper end of the intermediate tube and the upper end of the non-capillary tube connected to said upper end of the intermediate tube, the space between the seal and the mercury in the intermediate tube being substantially under a vacuum, the difference in the levels of the mercury columns in said U-tube indicating absolute pressure in said vacuum line, and means for reading said difference in level.

ADOLPH ZIMMERLI.